United States Patent [19]

Inaba et al.

[11] 4,423,998
[45] Jan. 3, 1984

[54] GRIPPING DEVICE

[75] Inventors: Hajimu Inaba, Hino; Shinsuke Sakakibara, Kunitachi, both of Japan

[73] Assignee: Fujitsu Fanuc Ltd., Tokyo, Japan

[21] Appl. No.: 283,184

[22] Filed: Jul. 14, 1981

[30] Foreign Application Priority Data

Jul. 24, 1980 [JP] Japan .............................. 55/101518

[51] Int. Cl.³ .............................................. B66C 1/00
[52] U.S. Cl. ................... 414/730; 250/222.1; 356/375; 414/744 A
[58] Field of Search ................. 414/730, 5, 744 A; 294/86 R; 318/628; 356/373, 375, 372; 250/358.1, 360.1, 359.1, 345, 349, 222 R, 221, 223 R, 206

[56] References Cited

U.S. PATENT DOCUMENTS 3,770,140 11/1973 Dukette .............................. 414/627
3,888,362 6/1975 Fletcher et al. ................. 414/730 X

FOREIGN PATENT DOCUMENTS 196362 5/1967 U.S.S.R. .............................. 356/375
723509 3/1980 U.S.S.R. .............................. 414/730

*Primary Examiner*—Joseph E. Valenza
*Assistant Examiner*—Donald W. Underwood
*Attorney, Agent, or Firm*—Staas & Halsey

[57] ABSTRACT

A gripping device on an industrial robot is provided with a plurality of light-emitting members for generating a plurality of light beams that intersect at predetermined angles, and with a plurality of light-receiving elements for receiving the light beams. When the gripping device moves relative to an object that is to be gripped, the object intercepts the light beams, on the basis of which the position of the object relative to the gripping device is detected. This permits even an object which is not precisely located at a predetermined position to be gripped accurately by the gripping device following detection of the object position.

9 Claims, 9 Drawing Figures

GRIPPING DEVICE

BACKGROUND OF THE INVENTION

This invention relates to a device for gripping an object, and more particularly, to a gripping device suitable for use on an industrial robot.

Industrial robots come equipped with a hand at one end of which is mounted a gripping device for gripping a workpiece, so that the workpiece can be transported from one location to another along a predetermined path. When repeatedly gripping and transporting workpieces, the workpiece gripping operation can be made more stable if the workpiece is arranged so that the gripping center of the gripping device arrives at the same fixed position every time a workpiece is gripped. However, when large numbers of workpieces are stacked manually by the workers at a plant, there is no assurance that all of the workpieces, which will later be gripped and transported by the gripping device, will be stacked with their centers in perfect alignment. A slight degree of non-coincidence between the center of a workpiece and the gripping center of the gripping device will not pose a major problem if the workpiece is light in weight, since one of the fingers on the gripping device will be able to shift the workpiece as the workpiece is gripped, thereby bringing the workpiece center and the gripping center into alignment so that the workpiece can be gripped firmly. With a heavy workpiece, however, the gripping device cannot apply a force sufficient to move the workpiece, so that the workpiece often cannot be gripped in the manner required.

BRIEF SUMMARY OF THE INVENTION

Accordingly, an object of the present invention is to provide a gripping device capable of gripping an object firmly even if the object is not located precisely at the prescribed position.

It is another object of the present invention to provide a gripping device whose gripping center is capable of being shifted to align with the center of an object when the center of the object is not located precisely at the prescribed position.

Still another object of the present invention is to provide a gripping device one end of which has a portion for sensing the position of an object, thereby allowing the position of the object to be confirmed before it is gripped by the gripping device.

Other features and advantages of the present invention will be apparent from the following description taken in connection with the accompanying drawings.

DESCRIPTION OF THE PREFERRED EMBODIMENTS

Figure 1:
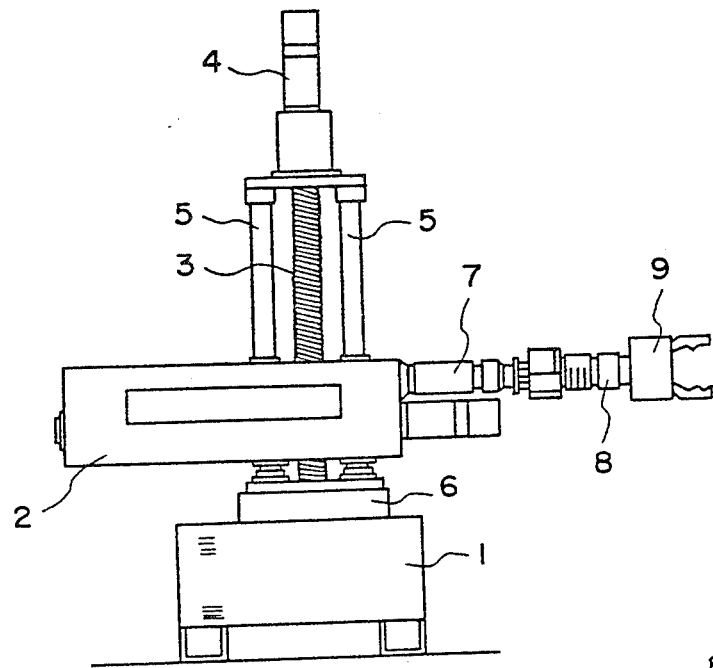
FIG. 1 is a front view of an industrial robot.

Referring first to FIG. 1, there is shown a front view of an industrial robot which is controlled in accordance with the present invention. The robot includes a base 1, the robot body 2, a screw rod 3 adapted to transport the robot body 2 vertically, a motor 4 for rotatively driving the screw rod 3, guide rods 5 for guiding the robot body 2 as it is moved vertically by the screw rod, a rotatable pedestal 6 for rotating the robot body, an arm 7 which can be extended or retracted longitudinally thereof, a wrist mechanism 8, and a workpiece gripping device 9.

Figure 2:
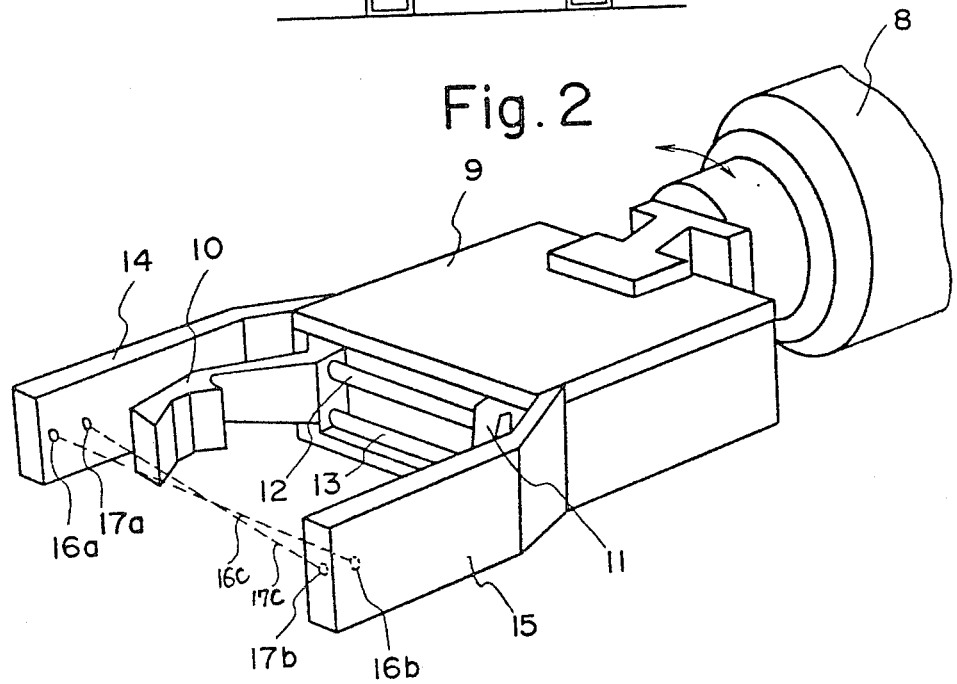
FIG. 2 is a perspective view showing a workpiece gripping device of an industrial robot, in accordance with the present invention.
Figure 3:
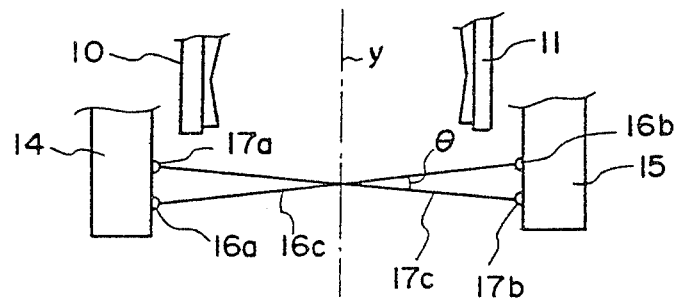
FIG. 3 is a plan view showing the paths of light beams emitted from the workpiece gripping device of the present invention.

The workpiece gripping device 9, shown in greater detail in FIGS. 2 and 3, includes two fingers 10 and 11 attached to the free end thereof, and two guide rods 12 and 13 along which the fingers 10 and 11 are guided so as to approach or separate from each other to permit a workpiece to be gripped or released. Further provided are outer frames 14 and 15 disposed outside the fingers 10 and 11, respectively. Two light-emitting elements 16a and 17a are provided on the inner side of the outer frame 14 at the end portion thereof, and two light-receiving elements 16b and 17b are provided on the inner side of the outer frame 15 at the end portion thereof. The light-emitting elements 16a and 17a are equipped with lens mechanisms, which are not shown. Light emitted by the light-emitting element 16a reaches the light receiving element 16b after being focussed into a fine beam 16c by the corresponding lens mechanism, and light emitted by the light-emitting element 17a reaches the light-receiving element 17b after being similarly focussed into a fine beam 17c by the corresponding lens mechanism. It will be appreciated from FIG. 3 that the light beams 16c and 17c from the light-emitting elements 16a and 17a cross each other, at an acute angle $\theta$, on the line y passing through the gripping center of the gripping device 9.

The gripping device of the above construction enables a workpiece to be gripped correctly even if the workpiece is not properly positioned at a prescribed location. The sequence for executing this operation will be described with reference to FIGS. 4(A) through 4(D).

Figure 4:
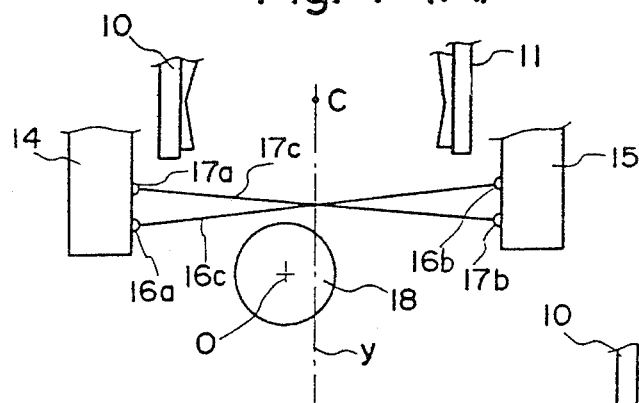
FIGS. 4(A) through 4(D) are illustrative views that are useful in describing the sequence through which the gripping device approaches and grasps a workpiece in accordance with the present invention.
Figure 4:
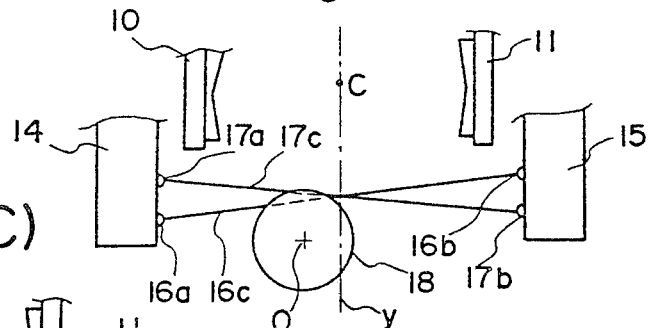
Figure 4:
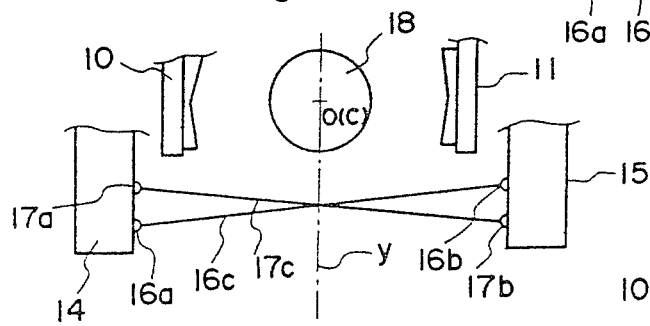
Figure 4:
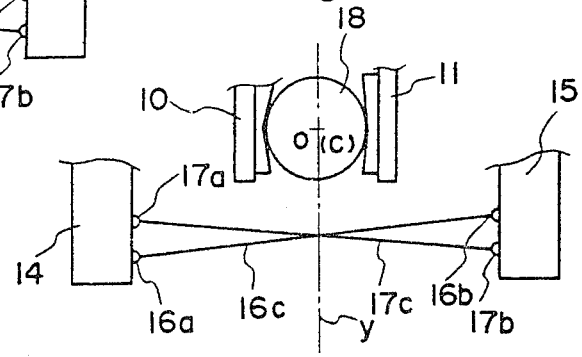

Referring first to FIG. 4(D), the gripping device 9 is shown approaching a workpiece 18 at a speed v along the gripping center line y which does not coincide with the center 0 of the workpiece. Next, as the gripping device reaches the proximity of the workpiece, the latter blocks the light beam 16c and 17c being emitted by the light-emitting elements 16a and 17a, as depicted in FIG. 4(B). This is sensed by the light-receiving elements 16b and 17b, respectively, allowing the planer position of the workpiece 18 to be detected through a sequence which will be described later. The robot, in response to the results of the position sensing operation just described, moves the arm 7 in such a manner that the gripping center C of the gripping device 9 is brought into agreement with the center 0 of the workpiece 18, as illustrated in FIG. 4(C). With coincidence established between the gripping center C and workpiece center 0, the fingers 10 and 11 are moved toward each other to grip the workpiece 18 firmly, as shown in FIG. 4(D), after which the workpiece 18 is carried by gripping device 9 at the end of the arm 7 to another location along a predetermined path.

Figure 5:
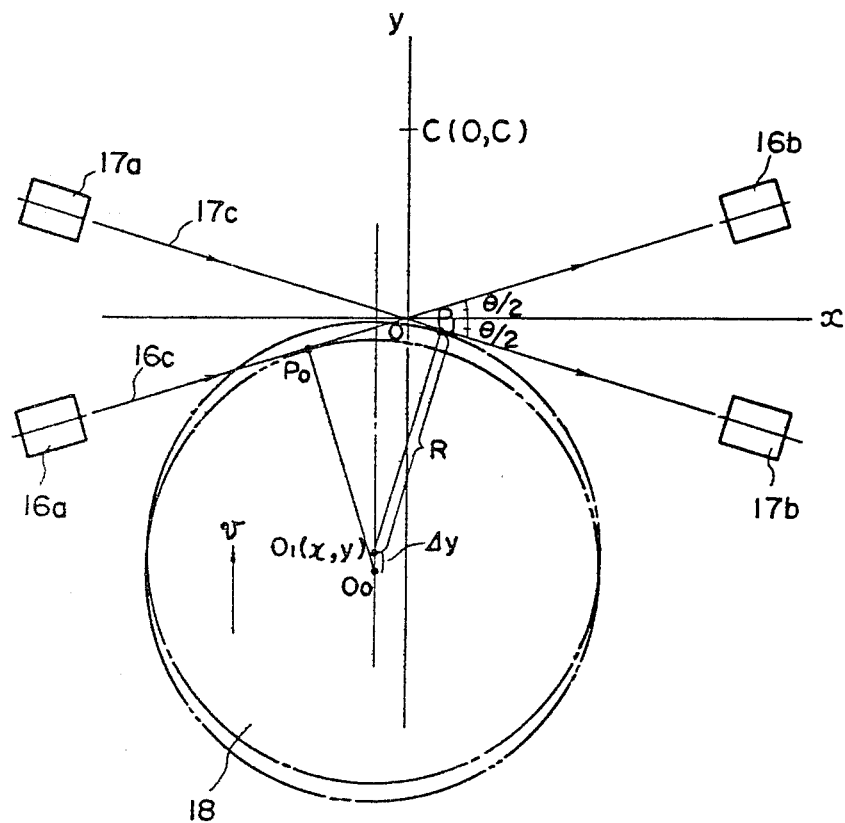
FIG. 5 is a plan view showing the relationship between the gripping device and the position of a workpiece.

Reference will now be had to FIG. 5 to describe the sequence through which the planer position of the workpiece 18 is sensed. Specifically, FIG. 5 is a plan view showing the positional relationship between the center 0 of the workpiece 18 and the gripping device 9 when the workpiece intercepts the light beams 16c and 17c. In FIG. 5, the y-axis denotes the gripping center line of the gripping device, and the x-axis denotes a straight line perpendicular to the y-axis at the point where the two light beams 16c and 17c cross, the x-axis lying in the gripping plane of the fingers 10 and 11. It should be noted that the gripping device 9 approaches the stationary workpiece 18 to effect the gripping operation. For the sake of simplicity, however, the description of the gripping operation will proceed as if the workpiece 18 is approaching the gripping device. In other words, in the description that follows, the x and y axes will be fixed and the workpiece will move relative thereto.

In FIG. 5, as the workpiece 18 gradually approaches the gripping device 9 and arrives at the position indicated by the two-dot chain line, the light beam 16c from the light-emitting element 16a is intercepted and blocked at the point $P_0$ on the circumference of the workpiece 18, so that the light beam no longer reaches the light-receiving element 16b. Further movement of the workpiece 18 to the position indicated by the one-dot chain line causes the light beam 17c to be intercepted and blocked at the point $P_1$ on the circumference of the workpiece, so that this light beam is now prevented from reaching the light-receiving element 17b. In the foregoing the center of the workpiece 18 has moved from $0_0$ to $0_1$ (given by the coordinates x, y), and the distance traversed by the center of the workpiece is $\Delta y$. Since the workpiece travels at the speed v in moving from the position of the two-dot chain line to that of the one-dot chain line, the distance $\Delta y$ may be written:

$$\Delta y = v \cdot \Delta t \quad (1)$$

In Equation (1), $\Delta t$ is the length of time measured from the instant at which light beam 16c is intercepted at point $P_0$ to the instant at which light beam 17c is intercepted at point $P_1$, and can be readily determined by the robot control device, which will be described below, from signals delivered by the light-receiving elements 16b and 17b. Letting R represents the radius of the workpiece 18, the following equations can be derived through geometrical calculation:

$$y = x \tan \frac{(\theta)}{2} - \frac{R}{\cos \frac{(\theta)}{2}} + \Delta y \quad (2)$$

$$\Delta y = -2x \tan \frac{(\theta)}{2} \quad (3)$$

In the above equations, $\theta$ is the angle of intersection of the light beams 16c and 17c. Furthermore, the coordinates x, y of the workpiece center at $0_1$ can be derived from Equations (2) and (3) as follows:

$$x = \frac{-\Delta y}{2} \cdot \cot \frac{(\theta)}{2} \quad (4)$$

$$y = \frac{\Delta y}{2} - \frac{R}{\cos \frac{(\theta)}{2}} \quad (5)$$

In the above, $\theta$ is a constant, and $\Delta y$ can be readily determined from Equation (1). If the workpiece radius R is given in advance as a variable, the robot control device will be capable of determining the coordinates of the workpiece center quite easily from Equations (4) and (5).

Since the coordinates (0, C) of the gripping center C of the gripping device 9 are constant, these values can be present in the robot control device. The coordinates of the workpiece center $0_1$, meanwhile, can be found from Equations (4) and (5). This makes it possible for the robot control device to compute the distance between the gripping center C and the workpiece center $0_1$, and to bring the point $0_1$ into coincidence with the point C by moving the workpiece 18 the required distance through use of a well-known numerical control method. It should be recalled, however, that in actual practice it is the gripping device that is moved toward the workpiece, and not vice versa.

Figure 6:
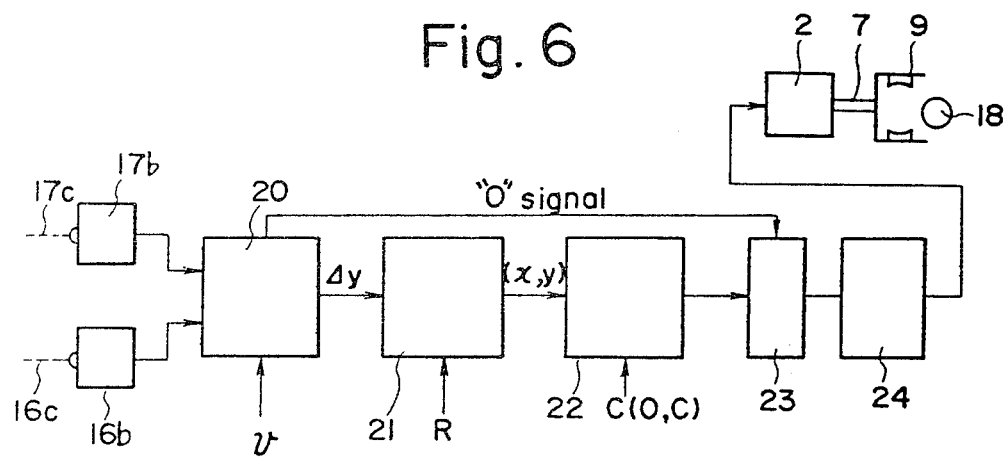
FIG. 6 is a block diagram showing a portion of control circuitry for controlling the workpiece gripping device of the present invention.

FIG. 6 is a block diagram of a robot control device for practicing the present invention. A distance measuring circuit 20 is adapted to compute the distance $\Delta y$. It does this by measuring the time $\Delta t$ which lapses between the delivery of an "0" output from one of the light-receiving elements 16b or 17b, and the delivery of an "0" output from the remaining one of these two light receiving elements, and then by multiplying this value by its other input, namely the travelling speed v of the gripping device. Thus, the distance measuring circuit 20 performs the computation expressed by Equation (1). The value of $\Delta y$ computed by circuit 20 is applied to a coordinates arithmetic unit 21 whose other input is the radius R of the workpiece 18, the arithmetic unit 21 using the values of $\Delta y$ and R to compute the coordinates (x, y) of the workpiece center $0_1$ from Equations (4) and (5). A distance arithmetic unit 22 receives the positional information indicating the coordinates (x, y) of the workpiece center $0_1$, as delivered by the arithmetic unit 21, as well as positional information indicating the constant coordinates (C, 0) of the gripping center, C, and uses these values of $0_1$ and of C to compute the linear distance between these two points. A controller 23 controls the robot which including the gripping device 9, and a servo mechanism 24 which moves the gripping device 9. In FIG. 6, numeral 2 denotes the robot body, 7 the arm, 9 the gripping device, and 18 the workpiece.

The robot control device of FIG. 6 operates in the following manner. First, assume that the gripping device 9 approaches the workpiece 18 at the speed v, and that the workpiece first intercepts the light beam 16c, and then intercepts the light beam 17c. The distance measuring circuit 20 computes the distance $\Delta y$ in response to the interception of the light beams 16c and 17c, and the coordinates arithmetic unit 21 computes the coordinates (x, y) of the center of the workpiece. The distance arithmetic unit 22 computes the distance from the center of the workpiece to the gripping center of the gripping device 9, calculates the direction in which the gripping device 9 must be moved to bring it toward the center of the workpiece 18, and supplies the controller 23 with the information relating to said distance and said direction. The controller 23 feeds commands to the servo mechanism 24 on the basis of the information from the distance arithmetic circuit 22, and the servo mechanism responds to the commands to drive the gripping device 9 until the gripping center C thereof coincides with the center 0 of the workpiece. When coincidence has been achieved, the controller 23 commands the servo mechanism 24 to drive the fingers 10, 11 toward each other to grip the workpiece.

When the workpiece 18 intercepts the light beams 16c and 17c simultaneously in the foregoing operation, this indicates that the center of the workpiece lies on the gripping device center line y and that the workpiece is, therefore, correctly positioned. In such case the distance measuring circuit 20 sends an "0" signal directly to the controller 23. The controller 23 interprets the arrival of the "0" signal as indicating that the workpiece is at the correct position, and permits the workpiece gripping device to approach the workpiece under the ordinary method of control.

It is obvious that a numerical control device may be adopted as the controller 23 in the arrangement of FIG. 6. The light-emitting and light-receiving elements, mounted on the tip of the outer frames of the gripping device in the above-described embodiment, may be provided near the bottom of the middle part of the outer frames or at the ends of the fingers.

In an alternative arrangement, minature laser units can be employed as the light-emitting members. The laser beams emitted by such units would be extremely narrow and would therefore provide much more precise information indicative of the position of the workpiece than where ordinary light is used.

The present invention as described in detail above makes it possible for the gripping center of a gripping device to be brought into coincidence with the center of a workpiece automatically even when the workpiece is not located precisely at the predetermined position. This allows the workpiece to be gripped assuredly so that even heavy workpieces that have been incorrectly positioned can be gripped and transported.

As many apparently widely different embodiments of the present invention can be made without departing from the spirit and scope thereof, it is to be understood that the invention is not limited to the specific embodiment thereof except as defined in the appended claims.

What we claim is:

1. An improved gripping device of the type having fingers for gripping an object, wherein the improvement comprises:
    a plurality of light-emitting members, provided on the gripping device, for generating a plurality of light beams that intersect at predetermined angles;
    a plurality of light-receiving members, provided on the gripping device, for receiving the plurality of light beams and for delivering output signals of one level when the light beams and received and of another level when the light beams are intercepted; and
    robot control means for receiving said output signals for measuring the distance to the position of the object on the basis of the timing at which the plurality of light beams are intercepted by the object as the gripping device moves relative to the object, and for moving the gripping center of the gripping device relative to the center of the object over the measured distance.

2. The improved gripping device of claim 1, wherein the robot control means comprises a distance measuring circuit, a coordinates arithmetic circuit, a distance arithmetic circuit, a controller and a servo-mechanism arithmetic circuit.

3. An improved gripping device provided on a robot for gripping an object offset from a predetermined position, wherein the improvement comprises:
    a plurality of light-emitting members, provided on the gripping device, for generating a plurality of light beams that intersect at predetermined angles;
    a plurality of light-receiving members, provided on the gripping device, for receiving the plurality of light beams for delivering output signals of one level when the light beams are received and of another level when the light beams are intercepted; and
    robot control means for receiving said output signals for measuring the distance to the position of the object on the basis of the timing at which the plurality of light beams are intercepted by the object as the gripping device is about to grip the object offset from a predetermined position, and for moving the gripping device over the measured distance so as to bring the gripping center of the gripping device into coincidence with the center of the object.

4. The improved gripping device of claim 3, wherein the robot control means includes a circuit means for generating a signal when the object intercepts the plurality of light beams simultaneously, said signal rendering said robot control means inoperative.

5. The improved gripping device of claim 3, wherein the robot control means comprises:
    (a) at least one distance measuring circuit,
    (b) at least one coordinates arithmetic circuit,
    (c) at least one controller, and
    (d) at least one servo-mechanism.

6. The improved gripping device of claim 1 or 3, wherein the plurality of light-emitting members are adapted to emit laser beams and the light receiving members are adapted to receive laser beams.

7. The improved gripping device of claims 2 or 5, wherein the controller is a numerical control device.

8. The improved gripping device of claim 1, or 3, wherein the plurality of light-emitting members and the plurality of light-receiving members are positioned near the bottom of the middle part of the outer frames.

9. An improved gripping device of the type having a plurality of fingers for gripping an object, comprising:
    (a) a plurality of outer frames disposed outside the fingers;
    (b) a plurality of light-emitting member provided on at least one outer frame for generating a plurality of light beams that intersect at predetermined angles;
    (c) a plurality of light-receiving members provided on at least one other outer frame for receiving the plurality of light beams; and
    (d) means for positioning the gripping device in response to detection of the interception of the plurality of light beams by the object as said gripping device moves relative to said object.

* * * * *

UNITED STATES PATENT AND TRADEMARK OFFICE
CERTIFICATE OF CORRECTION

PATENT NO. : 4,423,998

DATED : 1/3/84

INVENTOR(S) : HAJIMU INABA ET AL.

It is certified that error appears in the above-identified patent and that said Letters Patent is hereby corrected as shown below:

Column 2

Line 49, "4(D)" should be --4(A)--.

Column 6

Line 47, "1, or" should be --1 or--.

Signed and Sealed this

Fourth Day of September 1984

[SEAL]

Attest:

Attesting Officer

GERALD J. MOSSINGHOFF

Commissioner of Patents and Trademarks